United States Patent
Zock et al.

(10) Patent No.: US 10,167,620 B2
(45) Date of Patent: Jan. 1, 2019

(54) EROSION AND SEDIMENT CONTROL ABOVE GRATE BASED INLET FILTER SYSTEM

(71) Applicant: MKB Company, LLC, Groveport, OH (US)

(72) Inventors: Michael A. Zock, Saxonburg, PA (US); Jeffrey Karl Szebalskie, Mars, PA (US)

(73) Assignee: MKB COMPANY, Groveport, OH (US)

( * ) Notice: Subject to any disclaimer, the term of this patent is extended or adjusted under 35 U.S.C. 154(b) by 0 days.

(21) Appl. No.: 15/449,576

(22) Filed: Mar. 3, 2017

(65) Prior Publication Data

US 2017/0254063 A1    Sep. 7, 2017

Related U.S. Application Data

(60) Provisional application No. 62/303,619, filed on Mar. 4, 2016.

(51) Int. Cl.

| | |
|---|---|
| *E03F 5/00* | (2006.01) |
| *B01D 39/16* | (2006.01) |
| *E03F 5/04* | (2006.01) |
| *C02F 1/00* | (2006.01) |
| *E02B 3/10* | (2006.01) |
| *B01D 29/05* | (2006.01) |

(Continued)

(52) U.S. Cl.
CPC ............ *E03F 5/0404* (2013.01); *B01D 29/05* (2013.01); *B01D 39/1615* (2013.01); *B01D 39/1676* (2013.01); *C02F 1/004* (2013.01); *E02B 3/106* (2013.01); *B01D 2201/10* (2013.01); *B01D 2201/4069* (2013.01); *B01D 2239/0604* (2013.01); *C02F 2103/001* (2013.01); *E03F 5/06* (2013.01)

(58) Field of Classification Search
CPC .......... E03F 5/0404; E03F 5/06; B01D 29/05; B01D 39/1615; B01D 39/1676; B01D 2239/0604; E02B 3/106; E02B 3/129; E02B 8/00; C02F 2103/001
USPC .... 210/162, 163, 164, 170.03, 747.3; 404/2, 404/4, 5; 405/16, 107
See application file for complete search history.

(56) References Cited

U.S. PATENT DOCUMENTS

| | | |
|---|---|---|
| 5,575,925 A | 11/1996 | Logue, Jr. |
| 6,045,691 A | 4/2000 | McDermott |
| 6,059,964 A | 5/2000 | Strawser, Sr. |

(Continued)

*Primary Examiner* — Christopher Upton
(74) *Attorney, Agent, or Firm* — Blynn L. Shideler; Krisanne Shideler; BLK Law Group (57) ABSTRACT

An above grate based inlet filter system for erosion and sediment control comprises a natural fiber filter mat configured to extend beyond the perimeter of the grate and a securing mechanism, such as magnets, configured to securing the filter mat around the perimeter of the grate. The system may include a filter berm secured in vicinity to the mat, and a rectangular array of magnets coupling the filter mat to the grate. The natural fiber filter mat may effectively be a coir fiber filter mat extending beyond the perimeter of the grate, wherein the coir fiber filter mat is formed of vertically aligned coir fibers. The optional filter berm may be effectively formed as triangular in cross section and formed of 100% reticulated polyether foam and formed to be at least 3" in height.

20 Claims, 4 Drawing Sheets

(51) Int. Cl.
*C02F 103/00* (2006.01)
*E03F 5/06* (2006.01)

(56) References Cited

U.S. PATENT DOCUMENTS

| | | | |
|---|---|---|---|
| 6,086,758 A | 7/2000 | Schilling et al. | |
| 6,093,314 A | 7/2000 | Wilson et al. | |
| 6,706,172 B2 * | 3/2004 | Strawser, Sr. | E03F 5/0404 210/164 |
| 6,808,623 B2 * | 10/2004 | Harris | E03F 5/0404 210/164 |
| 7,070,691 B2 * | 7/2006 | Lindemulder | E03F 5/0404 210/164 |
| 7,201,843 B2 | 4/2007 | Sasaki et al. | |
| 7,208,081 B2 * | 4/2007 | Jones | E04D 13/076 210/162 |
| 7,399,411 B2 | 7/2008 | DeAngelis | |
| 7,481,921 B2 | 1/2009 | Kent | |
| 8,017,005 B2 | 9/2011 | Ringenbach et al. | |
| 8,043,498 B2 | 10/2011 | Rueda | |
| 8,051,568 B2 | 11/2011 | Moody et al. | |
| 8,216,453 B2 | 7/2012 | Moody et al. | |
| 8,679,328 B2 * | 3/2014 | Hebert | E03F 5/0404 210/163 |
| 2002/0130070 A1 * | 9/2002 | Roesner | E03F 5/0404 210/163 |
| 2002/0130083 A1 | 9/2002 | Middleton et al. | |
| 2004/0200767 A1 * | 10/2004 | Singleton | E03F 5/0404 210/163 |
| 2008/0149544 A1 * | 6/2008 | Shaw | E03F 5/0404 210/163 |
| 2008/0296211 A1 * | 12/2008 | Swan | E03F 5/0404 210/163 |
| 2013/0121768 A1 * | 5/2013 | Powell | E02D 29/02 405/107 |
| 2014/0048465 A1 * | 2/2014 | D'Andreta | E03F 5/06 210/163 |
| 2016/0040409 A1 * | 2/2016 | Powers | E03C 1/26 210/164 |
| 2017/0058504 A1 * | 3/2017 | Wilkie | E03F 5/0404 |

* cited by examiner

EROSION AND SEDIMENT CONTROL ABOVE GRATE BASED INLET FILTER SYSTEM

RELATED APPLICATIONS

This application claims priority to U.S. Patent Application Ser. No. 62/303,619 filed Mar. 4, 2016, entitled "Erosion and Sediment Control Inlet Grate Filter System" which is incorporated herein by reference.

BACKGROUND INFORMATION

1. Field of the Invention

The present invention relates to erosion and sediment control for inlet grates, and more particularly to above grate based inlet filter systems for erosion and sediment control.

2. Background Information

The present invention relates to erosion and sediment control filtration system and method finding particular utility in reducing the amount of silt, sedimentation and debris in water entering storm drains via the grate inlets.

In response to tighter guidelines imposed by the federal Environmental Protection Agency (EPA) under the Clean Water Act, additional regulatory attention is being focused on controlling silt and sediment found in storm, construction site and other sources of water runoff. Various federal and state agencies have issued mandates and developed guidelines regarding the prevention of non-point source pollution. These mandates affect water runoff from storms, construction sites, and other sources. Such laws and regulations have a significant impact on not only how runoff water may be channeled and diverted, but also on, for example, the ways that contractors can dispose of excess or unwanted water from constructions sites. With respect to construction sites, the EPA has a goal of having developers prevent eighty percent of general contaminants, such as unwanted, site-generated sediment, from entering inlet drains.

One conventional type of inlet drain protection is referenced as a filter bag or "silt sack", which is generally shown in the Pennsylvania Department of Environmental Protection (PaDEP) manual reproduced in FIGS. 1A-D. The inlet drain 10 includes a grate 12 over a vault or box 14 leading to the drain pipe 16. The inlet drain 10 may also include an above grade curb opening 18 within a curb 20. The conventional silt sack includes a filter bag 22 supported on a frame 24 (generally rebar members) that are held in place by the grate 12 on the box 14. The curb opening 18 may be blocked by a compost filter sock 26 or sand bags. The bag 22 may include a restraining mechanism 28 (nylon rope) to prevent excessive expansion of the bag 22. Many jurisdictions require an additional curb 30 to be used for below grate bag 22 installations. Other representative examples of the these known drain filter bags, silt sacks or drain inserts is found in U.S. Pat. Nos. 5,575,925, 6,086,758, 6,093,314, 6,059,964, and 6,045,691, and 7,201,843, and 8,017,005.

The applicant, headquartered in Pennsylvania, is involved with erosion and sediment control for the construction industry and has repeatedly seen the challenges of using below grate silt sacks for inlet sediment containment in residential developments during build-out. One of the drawbacks to existing filter bag filtering devices is the time and effort of installing, cleaning and replacing the filter bag filtering systems. Further in such systems silt, sedimentation, mud and other debris can build up quickly, causing the filtering devices to clog. As clogging begins, water flow decreases, which leads to a back-up of excess, unfiltered water. Back-ups may create additional regulatory, environmental, aesthetic and structural problems. Many systems have circumvented back-up of excess water by providing by-pass overflow features; however, while an overflow feature solves the immediate problem, the overflow water remains unfiltered, thereby defeating the primary intent of the filtration device.

When a filtering device's capacity is reduced to the point that it no longer adequately functions, the filter must be removed and either be disposed of or cleaned. Filtration devices can be difficult and time consuming to remove. For example, when a filtration device is attached to the underside of an inlet grate 12, such as bags 22, sediment is collected underneath the grate 12. Thus to change or clean a filter, the inlet grate 12 must first be removed. Next, either the bag 22 must be removed (to be cleaned or disposed of) or the sediment must be removed from the bag 22. Removal of the bag 22 can be difficult, as it may have a large mass of sediment that is very heavy. In this case, removal is at least taxing and time-consuming, possibly cumbersome and may even require lifting machinery. If the bag 22 does not hold a large volume of sediment, then removal will be more easily accomplished, but such remediation also must be done more frequently. In addition to the constraints and problems associated with cleaning or changing a filtering bag 22, timing also creates a problem. Oftentimes, clogging of filtering devices occurs during periods of heavy water flow, such as seasonal or other flooding periods. This presents an immediate need for cleaning or replacing a filter bag 22 coupled with circumstances that make the task even more difficult, onerous, and time-consuming.

Figures 1A, 1B, 1C, 1D, 2:
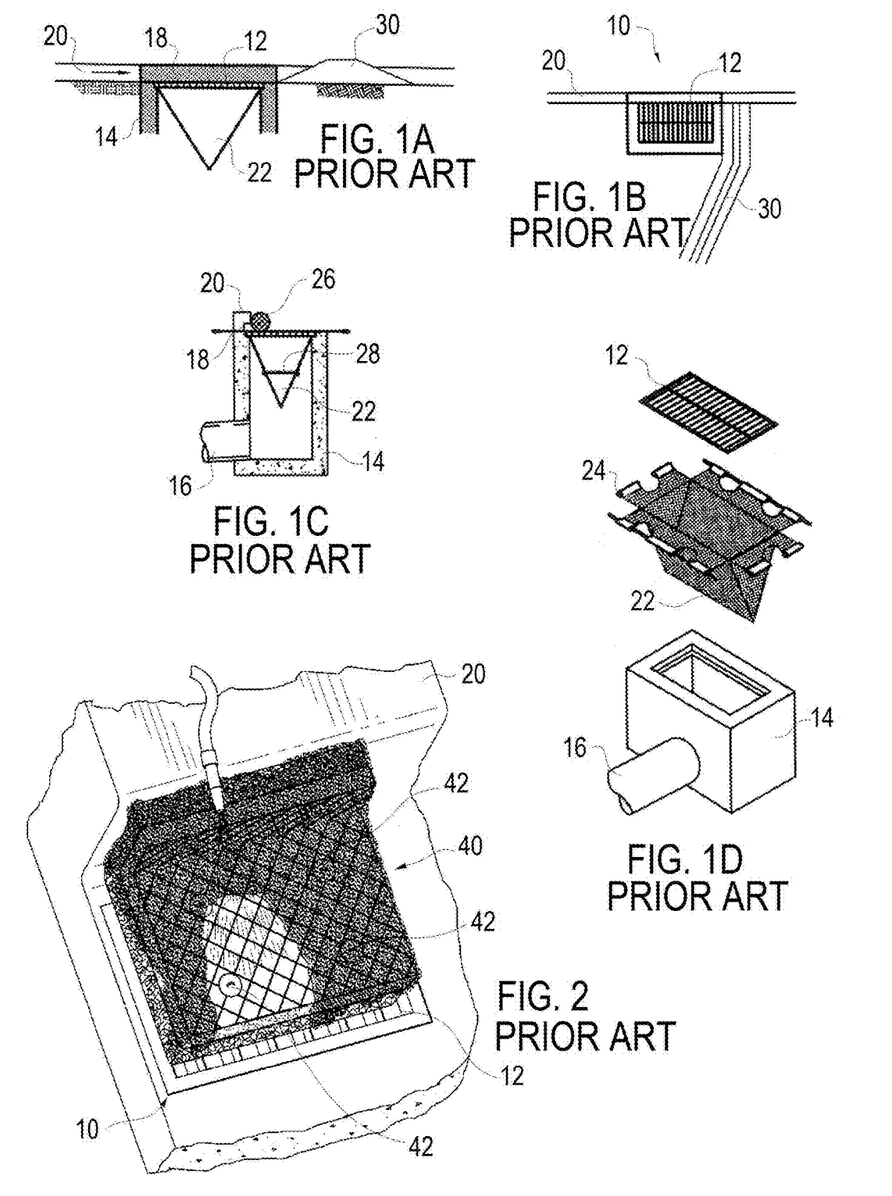
FIG. 1A is a schematic side sectional view of a conventional filter bag installation for an inlet drain.
FIG. 1B is a schematic plan view of the conventional filter bag installation of FIG. 1A.
FIG. 1C is a schematic end sectional view of the conventional filter bag installation of FIG. 1A.
FIG. 1D is a schematic exploded perspective view of the conventional filter bag installation of FIG. 1A.
FIG. 2 is a schematic perspective view of a known above grate based filter system installation for an inlet drain.

Some have attempted to address the deficiencies of the prior art with primarily above grate filter systems, (also may be references as above grade—but above grate is more accurate) such as disclosed in U.S. Pat. No. 7,481,921, which is incorporated herein by reference. The '921 patent teaches the use of a randomly aligned coir fiber filter member 40 formed preferably of two generally 1 inch high filtering segments secured to the grate 12 via a plurality of zip-tie or cable-tie members 42. This is generally shown in FIG. 2.

Coir is a natural fiber extracted from the husk of coconuts used in a variety of products such as floor mats, brushes, mattresses, etc. Specifically, coir is the fibrous material found between the hard, internal shell and the outer coat of a coconut. The '921 patent teaches a primary filter of portion having a described preferable density between "3 oz./sq. ft. (sic) and 4.5 oz./sq. ft. (sic)", and a secondary filter of portion having a density preferably between "4 oz./sq. ft (sic) and 6 oz./sq. ft. (sic)". The '498 patent, discussed below, has noted that "although the [921 patent] apparatus [40] succeeds in preventing the passage of sediment and small debris that would otherwise bypass the grating [12], it is likely that such a fibrous mat would need to be continuously cleaned and would quickly clog in high flow situations or if left untended for any significant period of time. Moreover, the [921 patent] apparatus [40] provides no method of filtering liquid contaminants, such as motor oil, that may commonly find their way to storm drains [10]." U.S. Patent Publication 2008-0296211, which is incorporated herein by reference, also teaches the use of a randomly aligned coir fiber filter member formed preferably of two generally 1 inch high filtering segments secured to the grate via a plurality of zip-tie or cable-tie members, and the '211 publication seems largely to follow the teachings of the '921 patent.

U.S. Pat. No. 8,043,498, which is incorporated herein by reference, discloses a curb inlet storm drain protector having: a first, top layer comprising a generally horizontal surface having a plurality of holes formed therein, and a plurality of substantially vertical projections emanating from said horizontal surface, wherein said holes allow passage of water vertically through said first layer, and wherein said vertical projections extend a height sufficient to prevent passage of debris across said top layer while permitting passage of water over said horizontal surface, thereby preventing the drain inlet from being clogged; a center layer composed of a screen or mesh having apertures of approximately one-eighth inch or greater in diameter; and a third layer composed of a felt material having hydrophobic properties; wherein said first, second and third layers are fastened together and act as a single barrier that is coextensively laid over said grate.

U.S. Pat. Nos. 8,051,568 and 8,216,453 disclose storm water grate cover for attaching over a storm water grate. The grate cover includes an expanded metal screen sized to fit over the storm water grate; a U-shaped edge trim having a plurality of barbs thereon; a high flow monofilament fabric filter sized to fit over the expanded metal screen and being attached to said expanded metal screen; and a plurality of bolts attaching the expanded metal screen and monofilament fabric filter to said storm water grate.

U.S. Patent Publications 2002-0130083 and U.S. Pat. No. 7,399,411 are also of interest in the above grate filter fields.

Accordingly, there exists a need for better devices, systems and methods for filtering sediment from water entering storm drains, specifically those which provide ease of installation; can be easily cleaned or changed, even during periodic flooding; prevent unwanted back-up of excess water; filter nearly all or all of the water that comes through the inlet; and are cost effective.

SUMMARY OF THE INVENTION

This invention is directed to an above grate, or above grade, based inlet filter system for erosion and sediment control comprising a natural fiber filter mat configured to extend beyond the perimeter of the grate in the open sides and a securing mechanism configured to securing the filter mat around the perimeter of the grate.

The erosion and sediment control filter system according to the invention may further include a polyether foam filter berm secured in vicinity to the mat, wherein the filter berm is formed of 100% reticulated polyether foam, and double sided tape securing the filter berm in position.

The erosion and sediment control filter system according to invention may provide wherein the natural fiber filter mat is coir fiber, and wherein the coir fiber filter mat is formed of vertically aligned coir fibers. Further the coir fiber filter mat may effectively be at least 2 inches thick and having a density of at least 35 oz/ft$^3$, and wherein the fibers of the mat are held together in a colored binder The erosion and sediment control filter system according to one embodiment of the invention may provide that the securing mechanism configured to securing the filter mat around the perimeter of the grate includes magnets, and wherein the magnets are formed of Neodymium magnetic sheet material.

The erosion and sediment control filter system according to invention may provide that at least two, or at least three, sides of the mat are undulating having a pattern of repeating recesses. Further the mat may include a plurality of high flow holes through the mat and closed at a bottom surface thereof. Further the mat may include at least one removable dewatering plug configured to allow for selective mat bypass during high water flow.

The features that characterize the present invention are pointed out with particularity in the claims which are part of this disclosure. These and other features of the invention, its operating advantages and the specific objects obtained by its use will be more fully understood from the following detailed description in connection with the attached figures.

DESCRIPTION OF THE PREFERRED EMBODIMENTS

As shown in the figures the present claimed invention yields an above grate based inlet filter system 100 for erosion and sediment control comprising a natural fiber filter mat 110 extending beyond the perimeter of the grate 12 of the inlet drain 10, a securing member such as magnets 112 or double sided tape 112' (embodiment of FIGS. 5A-B) securing the filter mat 110 completely around the perimeter of the grate 12, and optionally a filter berm 130 secured in vicinity to the mat 110 (such as by double sided tape securing the filter berm 130 in position). Natural fibers generally consist of coir fibers and fibers of jute, cotton, hemp and empty fruit bunches.

The erosion and sediment control filter system 100 according to the invention preferably utilizes a unique coir fiber filter mat 110 described in detail below. It is preferred that the coir fiber filter mat 110 extend beyond, generally at least three inches beyond, the inlet opening of the grate 12 to provide a minimum of 2" water travel for water to enter the grate 12. This overlap should be generally on all "open" sides of the grate 12, meaning those sides of the grate 12 not adjacent a curb 20 (or opening 118 in such curb). As shown herein, with a curb 20 present the filter mat 110 extends up to the curb 20.

Figures 3A, 3B, 3C, 4A, 4B, 4C:
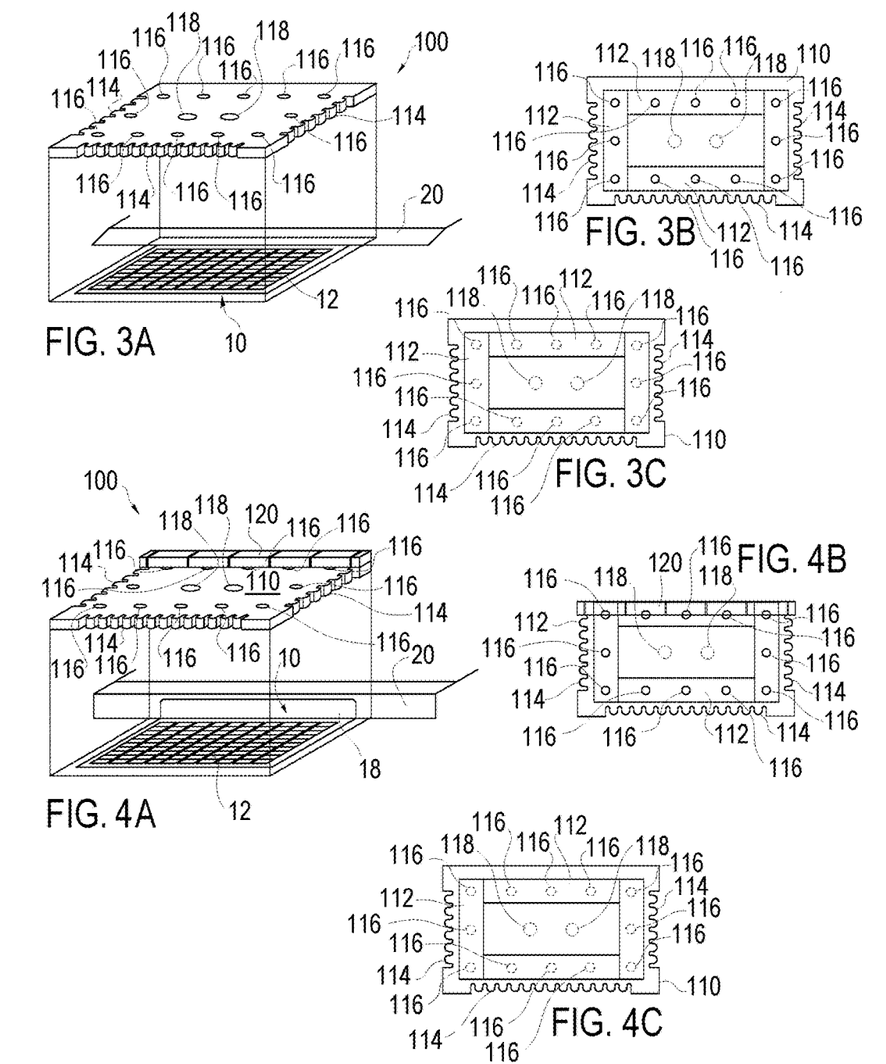
FIG. 3A is a schematic exploded view of an above grate based inlet filter system installation for an inlet drain according to one embodiment of the present invention.
FIG. 3B is a schematic top plan view of the above grate based inlet filter system installation of FIG. 3A.
FIG. 3C is a schematic bottom plan view of the above grate based inlet filter system installation of FIG. 3A.
FIG. 4A is a schematic exploded view of an above grate based inlet filter system installation for an inlet drain according to another embodiment of the present invention.
FIG. 4B is a schematic top plan view of the above grate based inlet filter system installation of FIG. 4A.
FIG. 4C is a schematic bottom plan view of the above grate based inlet filter system installation of FIG. 4A.

FIG. 3A-C illustrate the details of an above grate based inlet filter system 100 for an inlet drain 10 according to one embodiment of the present invention. The filter system 100 for erosion and sediment control comprises a natural fiber filter mat 110, the construction of the fibers of which are discussed below. The filter mat 110 extends beyond the inlet opening of the grate 12 on three sides and the filter mat 110 will butt against the curb 20.

Prior to installation the inlet grate 12 surface and surrounding area should be cleaned and cleared and the mat 110 installed with at least 2" clearance on the three open sides with the straight edge of the matt 110 adjacent the curb 20. The filter mat 110 includes four flexible magnetic sheets or magnets 112 glued to the undersurface of the filter mat 110 and forming a mechanism for attachment around the entire periphery of the steel grate 12. Each magnetic sheet 112 is a flexible member about 6" wide and may be effectively formed of a compound of neodymium (Nd) forming extremely strong permanent magnets. Neodymium magnetic sheet material is available from a number of manufacturers.

The open sides of mat 110 (those not facing the curb 20) includes an undulating edge 114, scalloped in this example, formed to increase the effective surface area through which water may flow through. Undulating in this context merely means a non-linear edge shape increasing the surface area of the edge as compared to a straight edge. A scalloped pattern of semicircular or oblong recesses is shown but other undulating patterns of repeating recesses (or projections) are easily contemplated, such as a saw-tooth pattern, a pattern of repeating rectangular recesses, a repeating dovetail recess opening pattern, and combinations thereof. The undulations increase the side edge surface area by about 40% and increase the operational flow rate of the filter mat 110 and increases the sediment capture of the mat 110 accordingly, as the majority of water will flow through the filter mat 110 into the grate 12 through the side edges of the filter mat 110. The closed side of the matt, the one facing the curb 20, is not undulating so the closed side edge of the mat 110 can be maintained in close proximity to the curb 20.

The matt 110 includes high flow holes 116 through the mat 110 in locations aligned with the magnets 112. The magnets 112 act to cap the bottom of the high flow holes 116. Thus in periods of high flow, water may be expected to flow over the top of the filter mat 110 and through the mat 110 at locations other than through the side edge. Water reaching the high flow holes 116 can flow into the holes 116 and then into the mat 110 and through the grate 112. The high flow holes 116 increase the operational capacity of the mat 110 and the system 100. The holes 116 are preferably 2 inches in diameter and centered on the underlying 6" wide magnet 12 such that water entering the mat 110 via openings 112 will travel at least 2 inches laterally through the mat 110, similar to the water at the outer edges of the mat 110. Ovals, rectangles or a variety of shapes may also easily form the holes 116.

The matt 110 includes emergency dewatering plugs 118, which here are merely circular plugs cut out of the mat 110 and thus formed out of the same natural fiber material as the mat 110. The plugs 118 act as a manual filter bypass and can be used when needed to rapidly remove water above the grate 112 (without filtering). One or both plugs 118 may be left out to prevent water buildup above the grate 12. The plugs have been formed as 3 inch diameter cylindrical plugs, but a number of shapes and sizes would work equally well. With one or both plugs 118 removed, in periods of very high water flow, water flowing over the mat 110 and reaching the open plugs 118 will move into the grate 112 bypassing the filtering of the mat 110. The fibrous nature of mat 110 allows these plugs 118 to be merely cut out and retained by friction or interference fit with the adjacent fibers. Alternatively a large opening retaining mesh (e.g. 1" openings) could optionally be glued to the underside of the mat 110 overlapping the opening formed by the plugs 118 to prevent the plugs 118 from being inadvertently pushed through the mat 110 and through the grate 12.

System for Drain with Curb and Curb Opening

The erosion and sediment control filter system 100 provides a coir fiber filter mat 110 which is a 32"×54" mat which is more than sufficient for a conventional inlet grate with adjacent curb 20. The curb 20 often may have a curb opening 18 entering the box 14 as shown in FIG. 4A and FIGS. 1A-D. In such a circumstance the filter mat 110 of FIGS. 3A-C may be bent at a right angle and extend up the curb 20 and cover the opening 18 and then bent 90 degrees to be coupled to the top of the curb 20, essentially treating the opening 118 as part of the inlet grate 12 in the present system. Alternatively the mat 110 could merely butt against the curb 20 and the opening 18 in the curb 20 could be filled with a portion of a foam filter berm 130 on top of the mat 110 or, alternatively, with a conventional compost filter sock on top of the mat 110, similar to the use of such socks with silt sacks shown above. More preferably, FIGS. 4A-C schematically show an above grate based inlet filter system 100 designed specifically for the inlet drain 10 with the curb opening 118. This embodiment of system 100 is the same as described above in connection with FIGS. 3A-C except for the inclusion of a blocking member 120 formed by another layer of matt material glued to the top surface of the underlying mat 110 and configured for forming an barrier in front of curb opening 118. The blocking member 120 is shown extending to but not completely covering the high flow openings 116 on the curb or closed side of the mat 110. The blocking member 120 prevents or at least minimizes the flow of water and sediment into the box 14 without going through the fibrous filtering material of the mat 110.

Systems with Non-Magnetic Grate Coupling

Figure 5A:
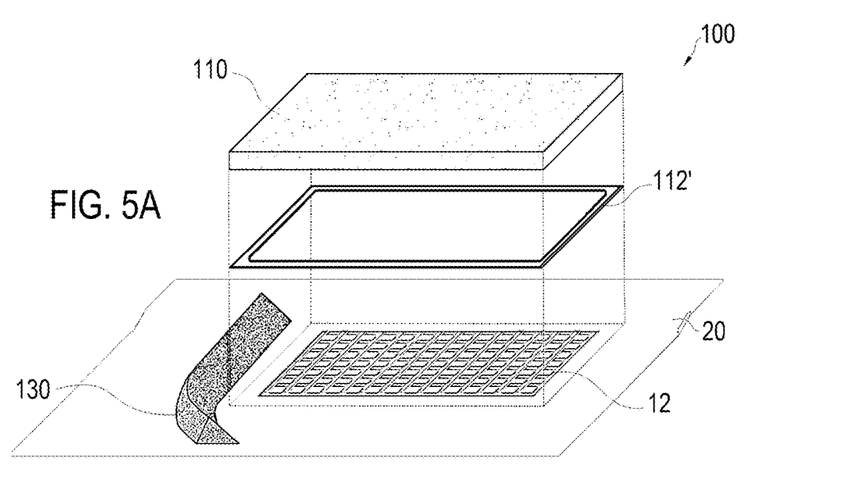
FIG. 5A is a schematic exploded view of an above grate based inlet filter system installation for an inlet drain according to another embodiment of the present invention.
Figure 5B:
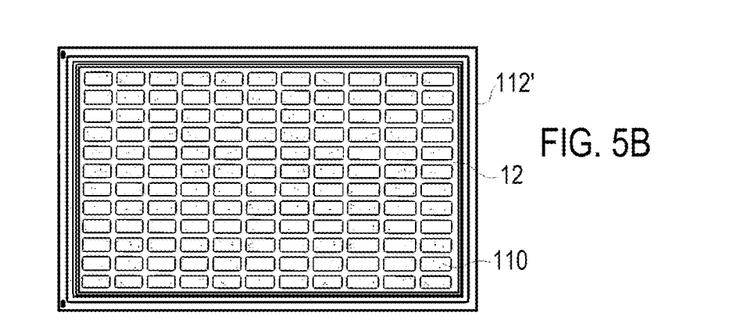
FIG. 5B is a schematic bottom plan view of the above grate based inlet filter system installation of FIG. 5A.
Figure 6:
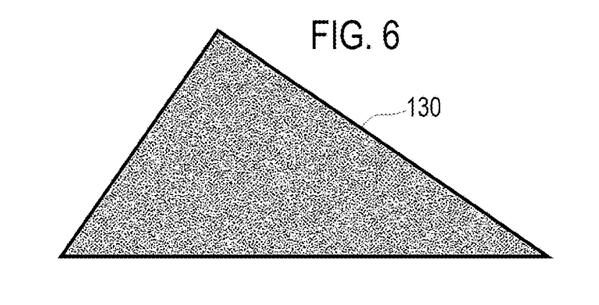
FIG. 6 is a schematic sectional view of a filter berm of the above grate based inlet filter system installation according to the invention.
Figures 7A, 7B, 7C:
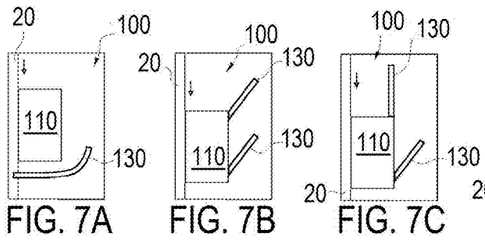
FIGS. 7A-J are schematic plan views illustrating representative filter berm placement in the above grate based inlet filter system installation according to the invention.
Figures 7D, 7E:
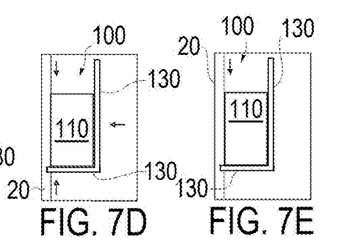
Figures 7F, 7G, 7H:
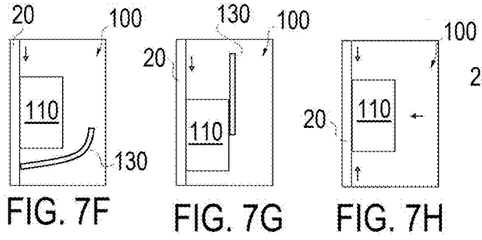
Figures 7I, 7J:
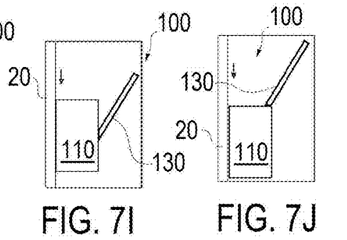

FIGS. 5A-B are schematic views of an above grate based inlet filter system 100 for an inlet drain 10 according to another embodiment of the present invention. The undulations 114, high flow holes 116 and bypass plugs 118 are omitted for clarity. Here the mat 110 is sealed around the grate 12 through the use of double sided butyl tape 112' which is a rubber-based tape that is commonly used for outside work in the construction and roofing industries and contains no harmful VOCs. In this embodiment the tape 112 must be sufficiently wide to close off any high flow opening 116, and the high flow openings 116 must be aligned with the tape 112' in the same manner as they are aligned with the magnets in earlier embodiments. This tape 112' handled the hot and cold, wet and dry, and if it remains after de-installation, the tape integrates into the asphalt street without being unsightly. The magnets 112 leave no residue and have the less environmental impact.

Prior art zip ties yield unfiltered water pathways or minimal filtered pathways between the ties. The sealing mechanisms of the present invention provide a seal around the entire periphery of the grate 12 minimizing or eliminating unfiltered pathways. A caulking or sealing adhesive (e.g., silicone sealant) could be used to form the sealing periphery connection between the mat 110 and the grate 12 of the drain 10, but the magnets 112 and also the double sided tape 112' are both easier to implement and environmentally preferred.

Filter Berm

The erosion and sediment control filter system 100 according to the present invention optionally uses a 100% reticulated, at least 3 inch tall triangular polyether foam filter berm 130 anchored in place with appropriate adhesive such as via 2-sided butyl tape. This optional berm 130 is shown in FIGS. 4A, 6 and 7A-J and provides filtering, sediment collection, and inlet backflow. The berm 130 can safely be driven over numerous times (automobiles and or construction equipment) for months in the field. The berm 130 won't rot from being wet, will resist UV, and will "snap back" from being squished thousands of times while installed. The berm 130 can be placed in several positions in relations to the filter mat as shown in FIGS. 7A-J depending generally upon the contour of the ground. The filter berm 130 of the system 100 can also be field cut, with a conventional utility knife, to allow for various desired configurations, with the goal be to either direct additional water toward the high end of the filter mat 110, to cradle water allowing low end "backflow" and sediment collection, or both.

The positioning of the filter berm 130 will depend upon the slope and contour of the terrain and the acceptable variations are known to those of ordinary skill in the art. As shown in one example of FIG. 7H the berm 130 may be omitted where flow is being received from all three sides of the grate 12 (not the curb 20 side).

Coir Fiber Mat

The fiber mat 110 of the present system is a preferably a coir fiber mat held together by a water-based latex binder. Coir fiber storm water inlet filter mats in general have been in the US market since 2008, and by at least 2016 have specific BMP approval in at least Idaho, Oregon, New York, and New Mexico. Appropriate manufacturers of coir fiber mats 110 include Blocksom & Co in Michigan City Ind.

In addition to the above description of the features of the mat 110, there are several additional critical distinctions between the mat 110 of the present invention and those inlet protection coir fiber mats of the prior art. First the fiber mat 110 of the invention is 33% thicker than conventional prior art commercially known coir fiber mats for storm drain protection, namely the present mat 110 is at least 2 inches thick. Additionally the density of the fibers of the present mat is preferably at least 35 ounce/cubic ft and distinct form the known mats in the field. Further the coir fiber mat 110 is designed specifically to extend beyond the inlet grate 12 on open sides thereof and to be sealed around the perimeter of the inlet grate 12 via magnets 112 or tape 112'.

The present development may utilize color in the latex binder to provide a desired color to the mat 110. Aside from branding opportunities of a unique color, the color of the mat 110 (other than typical brown of fibers) can be used as a visual indicator to improve operation. An easily visible blue, for example, can allow for more rapid spot checking of the units by operators as it is easier to spot when blue mats 110 are completely covered with sediment and detritus and thus need serviced. Additionally such color has the effect of making the inlet drain 10 more visible at the construction site.

Figures 8A, 8B:
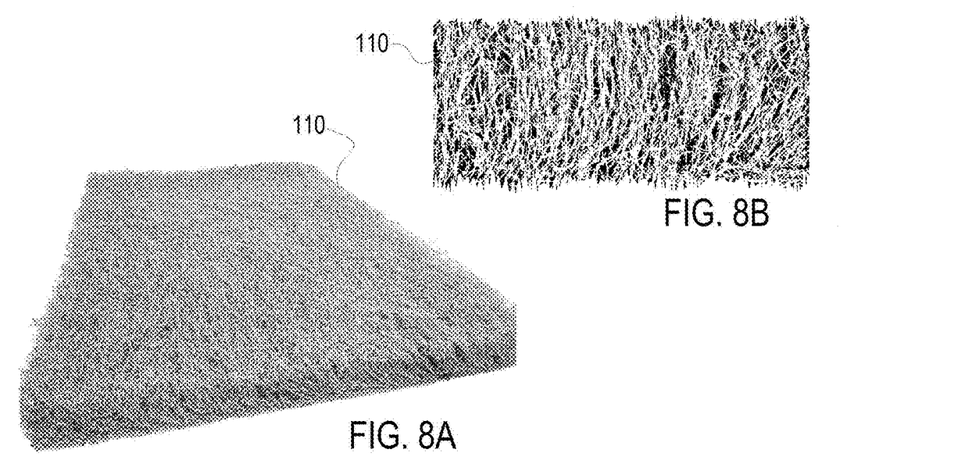
FIGS. 8A-B are enlarged sectional views illustrating the vertical coir fibers in the above grate based inlet filter system installation according to the invention.

The desired thickness and density for the mat 110 are achievable and yield the requisite flow through the use of a flat or unidirectional fiber orientation, namely what is known as a vertical orientation or vertically aligned coir fibers as shown in FIGS. 8A-B. The matt 110 may be effectively formed by having the coir fibers, i.e. the coconut husk fibers, in a vertical alignment held together by a water-based latex binder (with optional coloring, with light or bright blue being preferred) coupled to a mesh scrim of backing layer. The vertical orientation of the fibers requires the use of a distinct manufacturing process than random or curled fibers used in the prior art storm drain coir filter mats.

The coir mat 110 of the present invention can be described or classified as a specified subset or species of composite fiber constructions namely as a unidirectional, continuous fiber reinforced single layer structure. Composites are broadly categorized as fiber reinforced or particle reinforced, with the present mat 110 being an example of a fiber reinforced substrate. Further, under the fiber reinforced categorization there are single layer structures and multi-layer structures, and the mat 110 as shown is a single layer component. Under the single layer categorization there are continuous fiber reinforced products and discontinuous fiber reinforced (e.g., random or curled) products, and the present mat 110 is an example of a continuous fiber reinforced structure. Finally under the continuous fiber reinforced structure there are unidirectional and bi directional (e.g. woven) configurations and the mat 110 as described is a unidirectional product.

Inlet Filter Maintenance

The inlet filter mat 110 will collect sediment in use. The system 100 allows for the users to clean the inlet filter mat 110 while it remains mounted on the grate 12, even if ponded water surrounds the inlet drain 10. This feature ensures substantially all water entering the grate 12 is filtered, except where the bypass plug(s) 118 are removed or used. For maintenance the user need only sweep sides and top of inlet filter mat 110 to remove sediment and debris after each rain event. The sediment can be easily manually removed to complete the maintenance and the system 100 is ready for the next rain event. The mat 110 of the system 100 will visibly show street cleaning/sediment removal and inspection after every rain event and/or weekly. The system 100 should be periodically inspected as part of the maintenance and the inspection will include verifying the mat 110 and berm 130 (if present) are secure to the grate 12 and road, respectively, and that the mat 110 is not full of sediment, and that the mat 110 is not punctured, torn or highly compressed.

Summary

The system 100 of the present invention meets current performance requirements, especially related to hydraulic flow rate and sediment removal rate. The system 100 reduces the likelihood of street flooding as compared with current inlet silt sacks 22 which are prone to blockage during heavy sediment load. The design of the system 100 doesn't require a skidsteer/backhoe to install and maintain, as do systems requiring lifting of the grate 12, and this reduces the initial installation costs and reduces the maintenance and periodic sediment removal costs.

The system 100 is primarily intended for non-major paved roads (such as residential developments). Flooding the roadway at a low point is to be avoided and therefore, water flow bypassing inlets on an inclined roadway is to be avoided (Low-side "back flow" berm 130 is required). The system 100 is configured to stop all "coarse sand" or material not passing a US Standard Mesh Size No. 40 sieve. According to AASHTO "coarse sand" is material passing a No. 10 sieve but retained on a No. 40 sieve; and fine sand is material passing a No. 40 sieve but retained on a No. 200 sieve (Material larger than 0.42 mm size). The system 100 is easy to inspect and service periodically and after rain events.

The system 100 as described is "Green-centric" as it is made substantially from recycled/recyclable and/or biodegradable materials. The system 100 has yielded a viable, serviceable, and re-usable system 100 effective for at least 6 major rain events and/or at least 3 months of operation. The system 100 should be monitored for internal sediment buildup, puncture or tearing, and secured positioning fully covering the inlet grate. The users can replace as needed or every three months. The above grate system 100 is considered a near-flat compressible, but will spring back after compression during the entire product life. Further the matt 110 and berm 130 components of the system 100 are "colorable" for safety and/or product identification.

The system 100 described above (the 32"×54" rectangular mat) would be specific to the conventional 2×4 inlets, which is the most common inlet structure for residential developments. However other sizes may be manufactured as appropriate. For example a size and configuration with four undulating side 114 for grates that may have four open sides (middle of a parking lot) may be provided. Further another version with two adjacent open sides having undulations and two adjacent straight sides where the grate 12 is in a "closed" corner of an intersection of two roads and orthogonal curbs 20.

Field testing of the system 100 of the present invention yielded exceptionally promising results. At the trial homebuilder developments, street flooding was eliminated in use of the system 100 on the inlet grates 12 while sediment was easily collected and removed in a workman-like fashion. The Storm sewer inlet protection system 100 of the present invention reduces the likelihood of street flooding, which is historically a problem with silt sacks 22. The total lifecycle cost of the system 100 of the present invention is less than currently available commercial silt sacks 22 and the system 100 features a biodegradable coir filtration mat 110. This system 100 is particularly well suited to replace silt sacks 22 during the non-winter months of the year in non-heavy highway site work, especially residential construction.

System Testing—Engineering Testing—ASTM D7351

The ASTM D7351 test procedure was conducted to assess the level of compliance of the system 100 and mat 110 to the PA DEP specification. The 7351 test demonstrates the superior sediment retention when sediment laden water flows horizontally towards to the inlet filter mat 110 of the invention with the inlet filter mat horizontally installed over the catch basin or grate 12 in accordance with the present invention. In this test sediment both settled along the outside perimeter of the inlet filter mat 110 and was captured within the fibrous mass of vertically aligned coir fibers of the filter mat 110. As sediment builds up along the perimeter and within the fibrous mass, the hydraulic flow rate decreases and the sediment removal rate will increase.

The Test Parameters: 4000 lbs. water, 6% PA "real world" PA sediment load (240 lbs.), 30 minutes water flow. Targeted Particulate (TP): Particulate not passing a no. 40 sieve—or—larger than 0.42 mm in size The following results demonstrate the TP passing through the Inlet Filter Mat 110 of the invention. Additionally the testing has calculated the general hydraulic flow rate. The following ASTM D 7351 testing results evidence the advantages of the system of the present invention:

SRD/Setup: Diamond Sock Inlet Filter System (IFS) & 6% Sediment Concentration
Water/Soil Input/Duration: 3760 lbs water 240 lbs soil 90 minutes
Seepage Effectiveness: 68.15%
Soil Retention Effectiveness: 91.88%
Coarse Soil Retained: Less than 0.001% of particles ≥ US Sieve No. 40 passed through the device.

| Sediments | Sample ID | Associate Total Sediments, lbs | Total Dry Wt of Sample, g | Dry Wt of Sample >#40, g | Dry Wt of Sample >#40, lb | Percent of Total Sediments >#40 | Dry Wt of Total Sediments >#40, lbs | % of Sediments >#40 in Effluent |
|---|---|---|---|---|---|---|---|---|
| Influent (Upstream) | — | 240.00 | — | — | — | 26.50% | 63.6000 | — |
| Effluent (Downstream) | A0 | 2.83 | 1.56 | 0.0078 | 0.0000 | 0.0011% | 0.0000 | 0.0000% |
|  | A5 | 7.00 | 2.06 | 0.0309 | 0.0001 | 0.0033% | 0.0002 | 0.0004% |
|  | A10 | 4.48 | 3.83 | 0.0689 | 0.0002 | 0.0040% | 0.0002 | 0.0003% |
|  | A15 | 1.10 | 1.31 | 0.0000 | 0.0000 | 0.0000% | 0.0000 | 0.0000% |
|  | A20 | 0.27 | 1.13 | 0.0825 | 0.0002 | 0.0161% | 0.0000 | 0.0001% |
|  | A25 | 0.18 | 0.71 | 0.0000 | 0.0000 | 0.0000% | 0.0000 | 0.0000% |
|  | A30 | 0.09 | 0.46 | 0.0000 | 0.0000 | 0.0000% | 0.0000 | 0.0000% |
|  | A35 | 0.21 | 0.46 | 0.0000 | 0.0000 | 0.0000% | 0.0000 | 0.0000% |
|  | A45 | 0.80 | 0.46 | 0.0000 | 0.0000 | 0.0000% | 0.0000 | 0.0000% |
|  | A60 | 0.98 | 0.7 | 0.0014 | 0.0000 | 0.0004% | 0.0000 | 0.0000% |
|  | A75 | 0.89 | 0.7 | 0.0014 | 0.0000 | 0.0004% | 0.0000 | 0.0000% |
|  | A90 | 0.69 | 0.7 | 0.0014 | 0.0000 | 0.0004% | 0.0000 | 0.0000% |
| Totals |  | 19.49 | — | — | — | — | 0.0005 | 0.0008% |

Retention and Seepage Effectiveness Calculations
Setup: Diamond Sock Inlet Filter System (IFS) & 6% Sediment Concentration Soil Loam
Date: Jan. 27, 2016 Event 1 Start: 10:18 AM Stop: 11:48AM

| Sample Number | Test Time minutes | Soil Gradations measured | Total Weight g | Decanted Weight, g | Dry Weight, g | Bottle Weight, g | Dry Sediment Weight, mg | Total Collected Water Wt., g | Total Collected Volume of Water, l |
|---|---|---|---|---|---|---|---|---|---|
| Upstream |  | X |  |  |  |  |  |  |  |
| B0 | 0 | ○ | 396.58 | 189.44 | 171.31 | 150.54 | 20770 | 225.27 | 0.23 |
| B5 | 5 | ○ | 398.67 | 185.80 | 169.08 | 149.40 | 19680 | 229.59 | 0.23 |
| B10 | 10 | ○ | 401.81 | 183.94 | 166.27 | 149.20 | 17070 | 235.54 | 0.24 |
| B15 | 15 | ○ | 396.31 | 174.44 | 164.77 | 150.64 | 14130 | 231.54 | 0.23 |

-continued

Retention and Seepage Effectiveness Calculations
Setup: Diamond Sock Inlet Filter System (IFS) & 6% Sediment Concentration Soil Loam
Date: Jan. 27, 2016 Event 1 Start: 10:18 AM Stop: 11:48AM

| | | | | | | | | | |
|---|---|---|---|---|---|---|---|---|---|
| B20 | 20 | o | 396.32 | 168.99 | 163.87 | 152.25 | 11620 | 232.45 | 0.23 |
| B25 | 25 | o | 392.40 | 166.60 | 158.91 | 150.90 | 8010 | 233.49 | 0.23 |
| B30 | 30 | o | 369.90 | 159.99 | 154.99 | 150.45 | 4540 | 214.91 | 0.21 |
| | Water Added To Mixer (lbs): 3760 | | | | | Soil Added To Mixer (lbs): 240 | | | AVGS: |
| Downstream | | | | | | | | | |
| A0 | 0 | x | 352.69 | 151.10 | 146.72 | 145.16 | 1560 | 205.97 | 0.21 |
| A5 | 5 | x | 331.24 | 154.45 | 149.53 | 147.47 | 2060 | 181.71 | 0.18 |
| A10 | 10 | x | 348.01 | 156.59 | 152.64 | 150.81 | 1830 | 195.37 | 0.20 |
| A15 | 15 | x | 372.04 | 155.94 | 152.05 | 150.74 | 1310 | 219.99 | 0.22 |
| A20 | 20 | x | 372.60 | 152.37 | 148.68 | 147.55 | 1130 | 223.92 | 0.22 |
| A25 | 25 | x | 385.90 | 154.72 | 151.44 | 150.73 | 710 | 234.46 | 0.23 |
| A30 | 30 | x | 375.92 | 154.02 | 151.34 | 150.88 | 460 | 224.58 | 0.22 |
| A35 | 35 | o | 386.38 | 155.00 | 151.74 | 151.04 | 700 | 234.64 | 0.23 |
| A45 | 45 | o | 377.12 | 156.07 | 150.45 | 149.46 | 990 | 226.67 | 0.23 |
| A60 | 60 | x | 371.54 | 150.39 | 146.68 | 145.81 | 870 | 224.86 | 0.22 |
| A75 | 75 | o | 358.62 | 155.03 | 151.85 | 151.14 | 710 | 206.77 | 0.21 |
| A90 | 90 | o | 353.04 | 155.15 | 152.90 | 151.62 | 1280 | 200.14 | 0.20 |
| | Soil Collected (lbs): n/a | | | | | | | | AVGS: |
| | Soil Retention Effectiveness = 91.88% | | | | | Seepage Effectiveness = 68.15% | | | |

| Sample Number | Sediment Conc., mg/l | % Solids | Reservoir Weight, lb | Assoc. Discharge, gal | Cumm Discharge, gal | Coll. Tank Depth, in | Plot time | SRD Ponding Height, in | Comm Soil Loss, lbs | Assoc Solids Loss, lbs |
|---|---|---|---|---|---|---|---|---|---|---|
| Upstream | | | | | 0 | | 0 | | 0 | |
| B0 | 92200 | 9.22% | 4266 | 41 | 41 | | 2.5 | | 30.2 | 30.2 |
| B5 | 85715 | 8.57% | 3525 | 80 | 121 | | 7.5 | | 87.3 | 57.1 |
| B10 | 72472 | 7.25% | 2820 | 79 | 199 | | 12.5 | | 134.9 | 47.6 |
| B15 | 61026 | 6.10% | 2116 | 78 | 277 | | 17.5 | | 174.5 | 39.6 |
| B20 | 49989 | 5.00% | 1444 | 80 | 358 | | 22.5 | | 208.0 | 33.6 |
| B25 | 34306 | 3.43% | 706 | 74 | 432 | | 27.5 | | 229.3 | 21.2 |
| B30 | 21125 | 2.11% | 164 | 32 | 464 | | 30.0 | | 236.6 | 7.4 |
| | 60029 | 6.00% | | | | TOTALS: 463 | | | 236.6 | |
| Downstream | | | | | 0 | | 0 | | 0 | |
| A0 | 7574 | 0.76% | 0 | 36 | 36 | 0.0 | 2.5 | 0.0 | 2.8 | 2.8 |
| A5 | 11337 | 1.13% | 604 | 74 | 110 | 40.0 | 7.5 | 0.0 | 9.8 | 7.0 |
| A10 | 9367 | 0.94% | 1248 | 57 | 167 | 73.0 | 12.5 | 0.0 | 14.3 | 4.5 |
| A15 | 5955 | 0.60% | 1570 | 22 | 189 | 88.0 | 17.5 | 0.0 | 15.4 | 1.1 |
| A20 | 5046 | 0.50% | 1618 | 6 | 196 | 94.0 | 22.5 | 0.0 | 15.7 | 0.3 |
| A25 | 3028 | 0.30% | 1676 | 6 | 202 | 96.0 | 27.5 | 0.0 | 15.8 | 0.2 |
| A30 | 2048 | 0.20% | 1722 | 5 | 207 | 98.0 | 32.5 | 231.0 | 15.9 | 0.1 |
| A35 | 2983 | 0.30% | 1764 | 8 | 216 | 100.0 | 40.0 | 229.0 | 16.1 | 0.2 |
| A45 | 4368 | 0.44% | 1864 | 22 | 238 | 105.0 | 52.5 | 227.0 | 16.9 | 0.8 |
| A60 | 3869 | 0.39% | 2134 | 30 | 268 | 119.0 | 67.5 | 204.0 | 17.9 | 1.0 |
| A75 | 3434 | 0.34% | 2372 | 31 | 299 | 130.0 | 82.5 | 181.0 | 18.8 | 0.9 |
| A90 | 6396 | 0.64% | 2654 | 17 | 316 | 145.0 | 90.0 | 159.0 | 19.5 | 0.7 |
| | 3824 | 0.53% | | | | TOTALS: 316 | | | 19.5 | |
| | Soil Retention Effectiveness = 91.88% | | | | | Seepage Effectiveness = 68.15% | | | | |

While the invention has been shown in several particular embodiments it should be clear that various modifications may be made to the present invention without departing from the spirit and scope thereof. The scope of the present invention is defined by the appended claims and equivalents thereto.

What is claimed is:

1. An above grate based inlet filter system for erosion and sediment control comprising a natural fiber filter mat configured to extend beyond the perimeter of the grate, a securing mechanism configured to securing the filter mat around the perimeter of the grate, wherein the natural fiber filter mat is coir fiber and wherein the coir fiber filter mat is formed of vertically aligned coir fibers.

2. The erosion and sediment control filter system according to claim 1 further including a polyether foam filter berm secured in vicinity to the mat.

3. The erosion and sediment control filter system according to claim 2 wherein the filter berm is formed of 100% reticulated polyether foam, and double sided tape securing the filter berm in position.

4. The erosion and sediment control filter system according to claim 1 wherein the coir fiber filter mat is at least 2 inches thick.

5. The erosion and sediment control filter system according to claim 1 wherein the coir fiber filter mat has a density of at least 35 oz/ft$^3$.

6. The erosion and sediment control filter system according to claim 1 wherein the securing mechanism configured to securing the filter mat around the perimeter of the grate includes magnets.

7. The erosion and sediment control filter system according to claim 6 wherein the magnets are formed of Neodymium magnetic sheet material.

8. The erosion and sediment control filter system according to claim 1 wherein multiple sides of the mat are undulating having a pattern of repeating recesses.

9. The erosion and sediment control filter system according to claim 1 wherein the securing mechanism configured to securing the filter mat around the perimeter of the grate includes double sided tape securing the filter mat.

10. The erosion and sediment control filter system according to claim 1 wherein at least three sides of the mat are undulating having a pattern of repeating recesses.

11. The erosion and sediment control filter system according to claim 10 wherein the mat includes a plurality of high flow holes through the mat and closed at a bottom surface thereof by the magnets, and wherein the mat includes at least one removable dewatering plug configured to allow for selective mat bypass during high water flow.

12. The erosion and sediment control filter system according to claim 11 wherein the coir fiber filter mat is at least 2 inches thick, and has a density of at least 35 oz/ft$^3$.

13. The erosion and sediment control filter system according to claim 12 further including a filter berm which is triangular in cross section and is formed of 100% reticulated polyether foam and is at least 3" in height.

14. An above grate based inlet filter system for erosion and sediment control comprising a natural fiber filter mat configured to extend beyond the perimeter of the grate, a securing mechanism configured to securing the filter mat around the perimeter of the grate, wherein the mat includes a plurality of high flow holes through the mat and closed at a bottom surface thereof.

15. The erosion and sediment control filter system according to claim 14 wherein at least three sides of the mat are undulating having a pattern of repeating recesses.

16. An above grate based inlet filter system for erosion and sediment control comprising a natural fiber filter mat configured to extend beyond the perimeter of the grate, a securing mechanism configured to securing the filter mat around the perimeter of the grate, wherein the mat includes at least one removable dewatering plug configured to allow for selective mat bypass during high water flow.

17. The erosion and sediment control filter system according to claim 16 wherein each dewatering plug is formed out of the same natural fiber material as the mat.

18. The erosion and sediment control filter system according to claim 16 further including a polyether foam filter berm secured in vicinity to the mat.

19. The erosion and sediment control filter system according to claim 18 wherein the filter berm is formed of 100% reticulated polyether foam, and double sided tape securing the filter berm in position.

20. The erosion and sediment control filter system according to claim 16 wherein at least three sides of the mat are undulating having a pattern of repeating recesses.

* * * * *